United States Patent
Okabe et al.

(10) Patent No.: US 9,694,249 B2
(45) Date of Patent: Jul. 4, 2017

(54) METHOD FOR MANUFACTURING GOLF BALL

(71) Applicant: Dunlop Sports Co., Ltd., Kobe-shi, Hyogo (JP)

(72) Inventors: Satoko Okabe, Kobe (JP); Masatoshi Yokota, Kobe (JP); Koichi Fujisawa, Kobe (JP); Yusuke Tanigawa, Kobe (JP)

(73) Assignee: DUNLAOP SPORTS CO., LTD., Kobe-Shi, Hyogo (JP)

( * ) Notice: Subject to any disclaimer, the term of this patent is extended or adjusted under 35 U.S.C. 154(b) by 611 days.

(21) Appl. No.: 13/906,463

(22) Filed: May 31, 2013

(65) Prior Publication Data

US 2013/0320587 A1 Dec. 5, 2013

(30) Foreign Application Priority Data

Jun. 1, 2012 (JP) .................................. 2012-126598

(51) Int. Cl.
*A63B 45/00* (2006.01)
*A63B 37/00* (2006.01)
(Continued)

(52) U.S. Cl.
CPC .......... *A63B 45/00* (2013.01); *A63B 37/0051* (2013.01); *A63B 37/0063* (2013.01);
(Continued)

(58) Field of Classification Search
CPC ........ B29D 99/0042; A63B 2037/0079; A63B 37/0003; A63B 37/0022; A63B 37/0031;
(Continued)

(56) References Cited

U.S. PATENT DOCUMENTS

| | | |
|---|---|---|
| 5,403,010 A | 4/1995 | Yabuki et al. |
| 2002/0086742 A1 | 7/2002 | Yokota et al. |

(Continued)

FOREIGN PATENT DOCUMENTS

| | | |
|---|---|---|
| JP | 61-037178 A | 2/1986 |
| JP | 61-113475 A | 5/1986 |

(Continued)

OTHER PUBLICATIONS

English translation of Japanese Office Action, issued Apr. 12, 2016, for Japanese Application No. 2012-126598.

(Continued)

*Primary Examiner* — Robert J Grun
(74) *Attorney, Agent, or Firm* — Birch, Stewart, Kolasch & Birch, LLP (57) ABSTRACT

An object of the present invention is to provide a novel method of manufacturing a golf ball comprising forming a spherical core having less-variable compression deformation amount and stabilized properties. The present invention provides a method for manufacturing a golf ball, comprising the steps of: blending (a) a base rubber, (b) an α,β-unsaturated carboxylic acid having 3 to 8 carbon atoms and/or a metal salt thereof as a co-crosslinking agent, (c) a cross-linking initiator, (d) a carboxylic acid and/or a salt thereof having a number-average particle size ranging from 15 μm to 60 μm, and (e) where necessary a metal compound to prepare a core rubber composition; molding the core rubber composition into a spherical core under specific conditions; and forming at least one cover layer on the spherical core.

17 Claims, 1 Drawing Sheet

(51) Int. Cl.
*C08K 5/098* (2006.01)
*C08K 5/14* (2006.01)

(52) U.S. Cl.
CPC .......... *A63B 37/0074* (2013.01); *C08K 5/098* (2013.01); *C08K 5/14* (2013.01)

(58) Field of Classification Search
CPC ............ A63B 37/0033; A63B 37/0043; A63B 37/0051; A63B 37/0062; A63B 37/0063; A63B 37/0064; A63B 37/0074; A63B 37/0075; A63B 37/008; A63B 37/0087; A63B 37/0096; A63B 45/00; C08L 9/00
USPC ........................................................ 264/255
See application file for complete search history.

(56) References Cited

U.S. PATENT DOCUMENTS

| | | |
|---|---|---|
| 2006/0128900 A1 | 6/2006 | Nanba et al. |
| 2006/0135287 A1 | 6/2006 | Kennedy, III et al. |
| 2007/0173607 A1 | 7/2007 | Kennedy, III et al. |
| 2007/0202965 A1 | 8/2007 | Shindo et al. |
| 2008/0194357 A1 | 8/2008 | Higuchi |
| 2008/0194359 A1 | 8/2008 | Higuchi et al. |
| 2008/0214324 A1 | 9/2008 | Nanba et al. |
| 2009/0124757 A1* | 5/2009 | Shindo .................... C08J 3/226 525/193 |
| 2010/0273575 A1 | 10/2010 | Watanabe |

FOREIGN PATENT DOCUMENTS

| | | |
|---|---|---|
| JP | 61-253079 A | 11/1986 |
| JP | 6-154357 A | 6/1994 |
| JP | 2002-119613 A | 4/2002 |
| JP | 2003-12600 A | 1/2003 |
| JP | 2006-167452 A | 6/2006 |
| JP | 2007-222622 A | 9/2007 |
| JP | 2008-523952 A | 7/2008 |
| JP | 2008-194471 A | 8/2008 |
| JP | 2008-194473 A | 8/2008 |
| JP | 2008-212681 A | 9/2008 |
| JP | 2009-119256 A | 6/2009 |
| JP | 2010-253268 A | 11/2010 |

OTHER PUBLICATIONS

English translation of the Japanese Decision of Rejection dated Nov. 22, 2016, for Japanese Application No. 2012-126598.

* cited by examiner

METHOD FOR MANUFACTURING GOLF BALL

FIELD OF THE INVENTION

The present invention relates to a method for manufacturing golf balls, in particular, a technique for manufacturing a spherical core.

DESCRIPTION OF THE RELATED ART

As a method for improving flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

For example, Japanese Patent Publications Nos. S61-37178 A, S61-113475 A, S61-253079 A, 2008-212681 A, 2008-523952 A and 2009-119256 A disclose techniques of enhancing resilience of the core. Japanese Patent Publication No. S61-37178 A and S61-113475 A disclose a solid golf ball having an inner core where zinc acrylate as a co-crosslinking agent, palmitic acid, stearic acid, or myristic acid as a co-crosslinking activator, zinc oxide as another co-crosslinking activator, and a reaction rate retarder are blended.

Japanese Patent Publication No. S61-253079 A discloses a solid golf ball formed from a rubber composition containing an α,β-unsaturated carboxylic acid in an amount of 15 parts to 35 parts by weight, a metal compound to react with the α,β-unsaturated carboxylic acid and form a salt thereof in an amount of 7 parts to 60 parts by weight, and a high fatty acid metal salt in an amount of 1 part to 10 parts by weight with respect to 100 parts by weight of a base rubber.

Japanese Patent Publication No. 2008-212681 A discloses a golf ball comprising, as a component, a molded and crosslinked product obtained from a rubber composition essentially comprising a base rubber, a filler, an organic peroxide, an α,β-unsaturated carboxylic acid and/or a metal salt thereof, a copper salt of a saturated or unsaturated fatty acid.

Japanese Patent Publication No. 2008-523952 T discloses a golf ball, or a component thereof, molded from a composition comprising a base elastomer selected from the group consisting of polybutadiene and mixtures of polybutadiene with other elastomers, at least one metallic salt of an unsaturated monocarboxylic acid, a free radical initiator, and a non-conjugated diene monomer.

Japanese Patent Publication No. 2009-119256 A discloses a method of manufacturing a golf ball, comprising preparing a masterbatch of an unsaturated carboxylic acid and/or a metal salt thereof by mixing the unsaturated carboxylic acid and/or the metal salt thereof with a rubber material ahead, using the masterbatch to prepare a rubber composition containing the rubber material, and employing a heated and molded product of the rubber composition as a golf ball component, wherein the masterbatch of the unsaturated carboxylic acid and/or the metal salt thereof comprises; (A) from 20 wt % to 100 wt % of a modified polybutadiene obtained by modifying a polybutadiene having a vinyl content of from 0 to 2%, a cis-1,4 bond content of at least 80% and active terminals, the active terminal being modified with at least one type of alkoxysilane compound, and (B) from 80 wt % to 0 wt % of a diene rubber other than (A) the above rubber component [the figures are represented by wt % in the case that a total amount of (A) and (B) equal to 100 wt %] and (C) an unsaturated carboxylic acid and/or a metal salt thereof.

For example, Japanese Patent Publications Nos. H6-154357 A, 2008-194471 A, 2008-194473 A and 2010-253268 A disclose a core having a hardness distribution. Japanese Patent Publication No. H6-154357 A discloses a two-piece golf ball comprising a core formed of a rubber composition containing a base rubber, a co-crosslinking agent, and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant; the solid core has a deformation from 2.0 mm to 4.0 mm, when applying a load from an initial load of 10 kgf to a final load of 130 kgf and has the hardness distribution shown in the following table.

TABLE 1

| Hardness distribution in solid core | Shore D harness |
|---|---|
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q)-(S)] | 1 to 10 |
| Hardness difference [(S)-(R)] | 3 to 10 |

Japanese Patent Publication No. 2008-194473 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, and an inorganic filler; the solid core has a deformation from 2.0 mm to 4.0 mm, when applying a load from an initial load of 10 kgf to a final load of 130 kgf and has the hardness distribution shown in the following table.

TABLE 2

| Hardness distribution in solid core | Shore D harness |
|---|---|
| Center | 25 to 45 |
| Region located 5 to 10 mm from center | 39 to 58 |
| Region located 15 mm from center | 36 to 55 |
| Surface (S) | 55 to 75 |

TABLE 2-continued

| Hardness distribution in solid core | Shore D harness |
|---|---|
| Hardness difference between center and surface | 20 to 50 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)-(II) in JIS-C units being within ±2; and the envelope layer, intermediate layer and cover have hardness which satisfy the condition: cover hardness>intermediate layer hardness>envelope layer hardness.

SUMMARY OF THE INVENTION

The inventors of the present invention have found that a spherical core formed from a rubber composition containing (a) a base rubber, (b) an α,β-unsaturated carboxylic acid having 3 to 8 carbon atoms and/or a metal salt thereof, (c) a crosslinking initiator, and (d) a specific carboxylic acid and/or a salt thereof has hardness distribution where the hardness increases linearly or almost linearly from a center of the core toward a surface thereof, and have filed patent applications. The spherical core having a hardness distribution where the hardness increases linearly or almost linearly from the center of the core toward the surface thereof lowers a spin rate on driver shots, thereby providing a great flight distance.

The reason why the hardness of the core increases linearly or almost linearly from the center of the core toward the surface thereof is considered as follows. The metal salt of (b) the α,β-unsaturated carboxylic acid having 3 to 8 carbon atoms blended in the rubber composition is considered to form an ion cluster in the core, thereby crosslinking the rubber molecules with metals. By blending (d) the specific carboxylic acid and/or the salt thereof into this rubber composition, (d) the specific carboxylic acid and/or the salt thereof exchanges a cation with the ion cluster formed from the metal salt of (b) the α,β-unsaturated carboxylic acid having 3 to 8 carbon atoms, thereby breaking the metal crosslinking by the metal salt of the α,β-unsaturated carboxylic acid having 3 to 8 carbon atoms. This cation exchange reaction easily occurs at the core central part where the temperature is high, and less occurs toward the core surface. When molding a core, the internal temperature of the core is high at the core central part and decreases toward the core surface, since reaction heat from a crosslinking reaction of the base rubber accumulates at the core central part. In other words, the breaking of the metal crosslinking by (d) the specific carboxylic acid and/or the salt thereof easily occurs at the core central part, but less occurs toward the surface. As a result, it is conceivable that since a crosslinking density in the core increases from the center of the core toward the surface thereof, the core hardness increases linearly or almost linearly from the center of the core toward the surface thereof.

However, the spherical cores formed from the core composition containing (a) the base rubber, (b) the α,β-unsaturated carboxylic acid having 3 to 8 carbon atoms and/or the metal salt thereof, (c) the crosslinking initiator, and (d) the carboxylic acid and/or the salt thereof had problems that the compression deformation amounts thereof are variable and that the stable performance thereof is not obtained.

The present invention has been achieved in view of the above circumstances. An object of the present invention is to provide a novel method for manufacturing a golf ball, comprising forming a spherical core having less-variable compression deformation amount and stabilized physical properties, in a method for manufacturing the golf ball that comprises the spherical core and at least one cover layer covering the spherical core, wherein the spherical core is formed from the core rubber composition containing (a) the base rubber, (b) the α,β-unsaturated carboxylic acid having 3 to 8 carbon atoms and/or the metal salt thereof as a co-crosslinking agent, (c) the crosslinking initiator, (d) the carboxylic acid and/or the salt thereof, and where necessary (e) the metal compound.

The inventors of the present invention have studied the reasons of the variable compression deformation amounts and found that the variation in the component composition of the resultant core rubber composition tends to occur, because of the scattering of (d) the carboxylic acid and/or the salt thereof when blending the core rubber composition. Further, the inventors of the present invention have found that press conditions for molding the core rubber composition into the spherical core affect a curing reaction of the rubber composition, resulting in the variation in the compression deformation amount of the resultant spherical core.

The present invention that has solved the above problems provides a method for manufacturing a golf ball, comprising the steps of: blending (a) a base rubber, (b) an α,β-unsaturated carboxylic acid having 3 to 8 carbon atoms and/or a metal salt thereof as a co-crosslinking agent, (c) a crosslinking initiator, (d) a carboxylic acid and/or a salt thereof having a number-average particle size ranging from 15 μm to 60 μm, and where necessary (e) a metal compound to prepare a core rubber composition; molding the core rubber composition into a spherical core under following conditions (1) to (3): (1) press pressure: 1.0 MPa to 10.0 MPa; (2) press temperature: 130° C. to 170° C.; and (3) press time: 5 minutes to 20 minutes; and forming at least one cover layer on the spherical core.

By using (d) the carboxylic acid and/or the salt thereof having the number-average particle size ranging from 15 μm to 60 μm as the carboxylic acid and/or the salt thereof to be blended in the core rubber composition, scattering of the carboxylic acid and/or the salt thereof is reduced when blending the core materials. As a result, the core composition obtained by blending is stable in the component composition. In addition, by molding the obtained core rubber composition into a spherical core under the conditions (1) to (3), a variation in the compression deformation amount of the obtained spherical core is reduced and the physical properties thereof are stabilized.

According to the present invention, in a golf ball comprising a spherical core and at least one cover layer covering the spherical core wherein the spherical core is formed from a core rubber composition contains (a) a base rubber, (b) an α,β-unsaturated carboxylic acid having 3 to 8 carbon atoms and/or a metal salt thereof as a co-crosslinking agent, (c) a crosslinking initiator, and (d) a carboxylic acid and/or a salt thereof and where necessary (e) a metal compound, the golf ball having the spherical core with small variation in the compression deformation amount and the stabilized physical properties is provided.

DESCRIPTION OF THE PREFERRED EMBODIMENT

Figure 1:
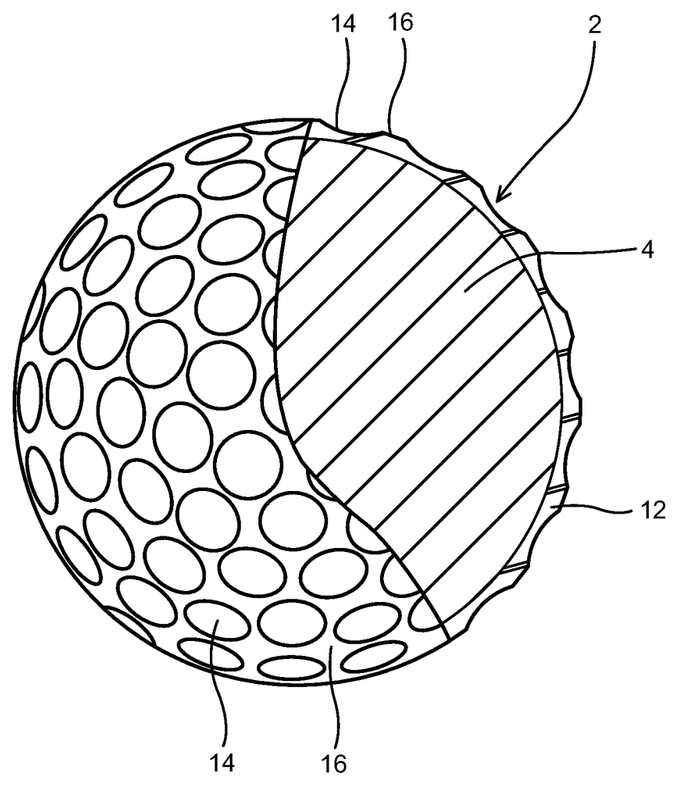
The FIGURE is a partially cutaway view of the golf ball of the preferred embodiment of the present invention.

The present invention is directed to a method for manufacturing a golf ball, comprising the steps of: blending (a) a base rubber, (b) an α,β-unsaturated carboxylic acid having 3 to 8 carbon atoms and/or a metal salt thereof as a co-crosslinking agent, (c) a crosslinking initiator, (d) a carboxylic acid and/or a salt thereof having a number-average particle size ranging from 15 μm to 60 μm, and where necessary (e) a metal compound to prepare a core rubber composition; molding the core rubber composition into a spherical core under following conditions (1) to (3): (1) press pressure: 1.0 MPa to 10.0 MPa; (2) press temperature: 130° C. to 170° C.; and (3) press time: 5 minutes to 20 minutes; and forming at least one cover layer on the spherical core.

First, blending materials used in the manufacturing method of the present invention will be described. In the inventive method for manufacturing the golf ball, (a) the base rubber, (b) the α,β-unsaturated carboxylic acid having 3 to 8 carbon atoms and/or the metal salt thereof as a co-crosslinking agent, (c) the crosslinking initiator, (d) the carboxylic acid and/or the salt thereof having the number-average particle size ranging from 15 μm to 60 μm, and where necessary (e) the metal compound are blended to prepare the core rubber composition.

As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Typically preferred of them is the high cis-polybutadiene having a cis-1,4 bond in a proportion of 40% or more, more preferably 80% or more, even more preferably 90% or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene is preferably one synthesized using a rare earth element catalyst. When a neodymium catalyst, which employs a neodymium compound which is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

Next, (b) the α,β-unsaturated carboxylic acid having 3 to 8 carbon atoms and/or a metal salt thereof will be described. (b) The α,β-unsaturated carboxylic acid having 3 to 8 carbon atoms and/or a metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition further contains (e) the metal compound which will be described later as an essential component. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination, (e) the metal compound may be used as an optional component.

The α,β-unsaturated carboxylic acid having 3 to 8 carbon atoms includes, for example, acrylic acid, methacrylic acid, fumaric acid, maleic acid, crotonic acid, and the like.

Examples of the metals constituting the metal salts of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum ion or the like; and other metal ions such as tin, zirconium or the like. The above metal ions can be used solely or as a mixture of at least two of them. Of these metal ions, divalent metal ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially, as the divalent metal salt, zinc acrylate is preferable, because zinc acrylate enhances the resilience of the resultant golf ball. The α,β-unsaturated carboxylic acid having 3 to 8 carbon atoms and/or a metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the content of (b) the α,β-unsaturated carboxylic acid having 3 to 8 carbon atoms and/or the metal salt thereof is less than 15 parts by mass, the content of (c) the crosslinking initiator which will be described below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Dicumyl peroxide is preferably used of them.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes too soft, and thus the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience and lower durability of the golf ball.

(d) The carboxylic acid and/or the salt thereof having the number-average particle size ranging from 15 μm to 60 μm used in the present invention will be described. By using the carboxylic acid and/or the salt thereof having the number-average particle size ranging from 15 μm to 60 μm, scattering of the carboxylic acid and/or the salt thereof is suppressed when blending the core materials, and the resultant core rubber composition obtained by blending is stable in the component composition. In this light, the carboxylic acid and/or the salt thereof preferably has a number-average particle size of 15 μm or more, more preferably 17 μm or more, and preferably has a number-average particle size of 60 μm or less, more preferably 58 μm or less.

As (d) the carboxylic acid and/or the salt thereof having the number-average particle size ranging from 15 μm to 60 μm used in the present invention, a carboxylic acid and/or a salt in a solid and granular form at 5° C. is preferred. For example, a carboxylic acid and/or a salt thereof that is liquefied by the heat during the blending of the rubber composition may be used, as long as the carboxylic acid and/or the salt thereof is in a solid granular form at 5° C. By using (d) the carboxylic acid and/or the salt thereof having the number-average particle size ranging from 15 μm to 60 μm in a solid granular form at 5° C., scattering can be suppressed even when the rubber composition is blended at a low temperature. In addition, by using a carboxylic acid and/or a salt thereof in a solid and granular form in a temperature range from 45° C. to 90° C., which is a preferable kneading temperature for making a first masterbatch described later, scattering can be suppressed during the kneading.

It is though that (d) the carboxylic acid and/or the salt thereof having the number-average particle size ranging from 15 μm to 60 μm has an action of breaking the metal crosslinking by the metal salt of (b) the α,β-unsaturated carboxylic acid having 3 to 8 carbon atoms, in the center part of the core, when molding the core. (d) The carboxylic acid and/or the salt thereof having the number-average particle size ranging from 15 μm to 60 μm may include any one of an aliphatic carboxylic acid (sometimes may be merely referred to as "fatty acid" in the present invention) and/or a salt thereof and an aromatic carboxylic acid and/or a salt thereof; however, the aliphatic carboxylic acid and/or the salt thereof is preferred. (d) The carboxylic acid and/or the salt thereof having the number-average particle size ranging from 15 μm to 60 μm preferably includes a carboxylic acid having 1 to 30 carbon atoms and/or a salt thereof, more preferably a carboxylic acid having 4 to 30 carbon atoms and/or a salt thereof, and even more preferably a carboxylic acid having 5 to 25 carbon atoms and/or a salt thereof. It is noted that (d) the carboxylic acid and/or the salt thereof having the number-average particle size ranging from 15 μm to 60 μm does not include (b) the α,β-unsaturated carboxylic acid having 3 to 8 carbon atoms and/or the metal salt thereof as the co-crosslinking agent.

The fatty acid may be either a saturated fatty acid or an unsaturated fatty acid; however, a saturated fatty acid is preferable. Specific examples of the saturated fatty acids (IUPAC name) are methanoic acid (C1), ethanoic acid (C2), propanoic acid (C3), butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecnoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), triacontanoic acid (C30).

Specific examples of the unsaturated fatty acid (IUPAC) are ethenoic acid (C2), propenoic acid (C3), butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), triacontenoic acid (C30).

Specific examples of the fatty acid (Common name) are, formic acid (C1), acetic acid (C2), propionic acid (C3), butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). The fatty acid may be used alone or as a mixture of at least two of them. Of those described above, caprylic acid, capric acid, lauric acid, myristic acid, palmitic acid, stearic acid, behenic acid and oleic acid are preferable as the fatty acid.

There is no particular limitation on the aromatic carboxylic acid, as long as it is a compound that has an aromatic ring and a carboxyl group. Specific examples of the aromatic carboxylic acid include, for example, benzoic acid (C7), phthalic acid (C8), isophthalic acid (C8), terephthalic acid (C8), hemimellitic acid (benzene-1,2,3-tricarboxylic acid) (C9), trimellitic acid (benzene-1,2,4-tricarboxylic acid) (C9), trimesic acid (benzene-1,3,5-tricarboxylic acid) (C9), mellophanic acid (benzene-1,2,3,4-tetracarboxylic acid) (C10), prehnitic acid (benzene-1,2,3,5-tetracarboxylic acid) (C10), pyromellitic acid (benzene-1,2,4,5-tetracarboxylic acid) (C10), mellitic acid (benzene hexacarboxylic acid) (C12), diphenic acid (biphenyl-2,2'-dicarboxylic acid) (C12), toluic acid (methylbenzoic acid) (C8), xylic acid (C9), prehnitylic acid (2,3,4-trimethylbenzoic acid) (C10), γ-isodurylic acid (2,3,5-trimethylbenzoic acid) (C10), durylic acid (2,4,5-trimethylbenzoic acid) (C10), β-isodurylic acid (2,4,6-trimethylbenzoic acid) (C10), α-isodurylic acid (3,4,5-trimethylbenzoic acid) (C10), cuminic acid (4-isopropylbenzoic acid) (C10), uvitic acid (5-methylisophthalic acid) (C9), α-toluic acid (phenylacetic acid) (C8), hydratropic acid (2-phenylpropanoic acid) (C9), and hydrocinnamic acid (3-phenylpropanoic acid) (C9).

Furthermore, examples of the aromatic carboxylic acid substituted with a hydroxyl group, an alkoxy group, or an oxo group include, for example, salicylic acid (2-hydroxybenzoic acid) (C7), anisic acid (methoxybenzoic acid) (C8), cresotinic acid (hydroxy (methyl)benzoic acid) (C8), o-homosalicylic acid (2-hydroxy-3-methylbenzoic acid) (C8), m-homosalicylic acid (2-hydroxy-4-methylbenzoic acid) (C8), p-homosalicylic acid (2-hydroxy-5-methylbenzoic acid) (C8), o-pyrocatechuic acid (2,3-dihydroxybenzoic acid) (C7), β-resorcylic acid (2,4-dihydroxybenzoic acid) (C7), γ-resorcylic acid (2,6-dihydroxybenzoic acid) (C7), protocatechuic acid (3,4-dihydroxybenzoic acid) (C7), α-resorcylic acid (3,5-dihydroxybenzoic acid) (C7), vanillic acid (4-hydroxy-3-methoxybenzoic acid) (C8), isovanillic acid (3-hydroxy-4-methoxybenzoic acid) (C8), veratric acid (3,4-dimethoxybenzoic acid) (C9), o-veratric acid (2,3-dimethoxybenzoic acid) (C9), orsellinic acid (2,4-dihydroxy-6-methylbenzoic acid) (C8), m-hemipinic acid (4,5-dimethoxyphthalic acid) (C10), gallic acid (3,4,5-trihydroxybenzoic acid) (C7), syringic acid (4-hydroxy-3,5-dimethoxybenzoic acid) (C9), asaronic acid (2,4,5-trimethoxybenzoic acid) (C10), mandelic acid (hydroxy (phenyl)acetic acid) (C8), vanilmandelic acid (hydroxy (4-hydroxy-3-methoxy phenyl)acetic acid) (C9), homoanisic acid ((4-methoxy phenyl)acetic acid) (C9), homogentisic acid ((2,5-dihydroxyphenyl)acetic acid) (C8), homoprotocatechuic acid ((3,4-dihydroxyphenyl)acetic acid) (C8), homovanillic acid ((4-hydroxy-3-methoxy phenyl)acetic acid) (C9), homoisovanillic acid ((3-hydroxy-4-methoxy phenyl)acetic acid) (C9), homoveratric acid ((3,4-dimethoxy phenyl)acetic acid) (C10), o-homoveratric acid ((2,3-dimethoxy phenyl)acetic acid) (C10), homophthalic acid (2-(carboxymethyl)benzoic acid) (C9), homoisophthalic acid (3-(carboxymethyl)benzoic acid) (C9), homoterephthalic acid (4-(carboxymethyl)benzoic acid) (C9), phthalonic acid (2-(carboxycarbonyl)benzoic acid) (C9), isophthalonic acid (3-(carboxycarbonyl)benzoic acid) (C9), terephthalonic acid (4-(carboxycarbonyl)benzoic acid) (C9), benzilic acid (hydroxy diphenylacetic acid) (C14), atrolactic acid (2-hydroxy-2-phenylpropanoic acid) (C9), tropic acid (3-hydroxy-2-phenylpropanoic acid) (C9), melilotic acid (3-(2-hydroxyphenyl)propanoic acid) (C9), phioretic acid (3-(4-hydroxy phenyl)propanoic acid) (C9), hydrocaffeic acid (3-(3,4-dihydroxyphenyl) propanoic acid) (C9), hydroferulic acid (3-(4-hydroxy-3-methoxy phenyl) propanoic acid) (C10), hydroisoferulic acid (3-(3-hydroxy-4-methoxy phenyl)propanoic acid) (C10), p-coumaric acid (3-(4-hydroxy phenyl)acrylic acid) (C9), umbellic acid (3-(2,4-dihydroxyphenyl)acrylic acid) (C9), caffeic acid (3-(3,4-dihydroxyphenyl)acrylic acid) (C9), ferulic acid (3-(4-hydroxy-3-methoxy phenyl)acrylic acid) (C10), isoferulic acid (3-(3-hydroxy-4-methoxy phenyl)acrylic acid) (C10), and sinapic acid (3-(4-hydroxy-3,5-dimethoxy phenyl) acrylic acid) (C11).

The salt of (d) the carboxylic acid having the number-average particle size ranging from 15 μm to 60 μm may include a salt of the carboxylic acids described above. The cation component of the salt of the carboxylic acid may be any one of a metal ion, an ammonium ion and an organic cation. The metal ion includes monovalent metal ions such as sodium, potassium, lithium, silver and the like; divalent metal ions such as magnesium, calcium, zinc, barium, cadmium, copper, cobalt, nickel, manganese and the like; trivalent metal ions such as aluminum, iron and the like; and other ions such as tin, zirconium, titanium and the like. The cation components may be used alone or as a mixture of at least two of them.

The organic cation includes a cation having a carbon chain. The organic cation includes, for example, without limitation, an organic ammonium ion. Examples of the organic ammonium ion are: primary ammonium ions such as stearyl ammonium ion, hexyl ammonium ion, octhyl ammonium ion, 2-ethyl hexyl ammonium ion or the like; secondary ammonium ions such as dodecyl (lauryl) ammonium ion, octadecyl (stearyl) ammonium ion or the like; tertiary ammonium ions such as trioctyl ammonium ion or the like; and quaternary ammonium ions such as dioctyldimethyl ammonium ion, distearyldimethyl ammonium ion or the like. Those organic cation may be used alone or as a mixture of at least two of them.

The content of (d) the carboxylic acid and/or the salt thereof having the number-average particle size ranging from 15 μm to 60 μm is preferably 0.1 part by mass or more, more preferably 0.5 part by mass or more, more preferably 1.0 part by mass or more, and is preferably 40.0 parts by mass or less, more preferably 30.0 parts by mass or less, even more preferably 20.0 parts by mass or less with respect to 100 parts by mass of (a) the base rubber.

If the content of (d) the carboxylic acid and/or the salt thereof having the number-average particle size ranging from 15 μm to 60 μm is too little, an effect of adding (d) the carboxylic acid and/or the salt thereof is not sufficient, and thus the degree of the outer-hard inner-soft structure of the spherical core may be lowered. If the content is too much, the resilience of the core may be lowered, since the hardness of the resultant core may be lowered as a whole. There are cases where the surface of the zinc acrylate used as the co-crosslinking agent is treated with a carboxylic acid and/or a salt thereof to improve the dispersibility to the rubber. In the case of using zinc acrylate whose surface is treated with a carboxylic acid and/or a salt thereof, in the present invention, the amount of the carboxylic acid and/or the salt thereof used as a surface treating agent is not included in the content of (d) the carboxylic acid and/or the salt thereof. That is because it is conceivable that (d) the carboxylic acid and/or the salt thereof used as a surface treating agent hardly contributes to the cation exchange reaction with (b) the co-crosslinking agent.

The rubber composition used in the present invention further contains (e) a metal compound, where necessary. (e) The metal compound is a filler to improve properties of the core rubber composition. For example, (e) the metal compound is used, without limitation, as a neutralizing agent to neutralize the α,β-unsaturated carboxylic acid having 3 to 8 carbon atoms in the case of containing only (b) the α,β-unsaturated carboxylic acid having 3 to 8 carbon atoms as the co-crosslinking agent, a weight adjusting agent to adjust the weight of the spherical core, a hardness adjusting agent to adjust the hardness of the spherical core, or an inorganic pigment. (e) The metal compound may be used for either one purpose or multiple purposes.

(e) The metal compound that can neutralize (b) the α,β-unsaturated carboxylic acid having 3 to 8 carbon atoms as the co-crosslinking agent includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. In light of reacting with (b) the α,β-unsaturated carboxylic acid having 3 to 8 carbon atoms as the co-crosslinking agent to form a metal crosslinking, (e) the metal compound preferably includes a divalent metal compound, more preferably includes a zinc compound. Use of the zinc compound provides a golf ball with excellent resilience. The content of (e) the metal compound used as the neutralizing agent is preferably determined in accordance with the mole number of the carboxyl group of (b) the α,β-unsaturated carboxylic acid having 3 to 8 carbon atoms as well as the desired degree of neutralization.

(e) The metal compound used as the filler to adjust the weight and hardness of the spherical core includes, for example, zinc oxide, barium sulfate, calcium carbonate, magnesium oxide, tungsten powder, molybdenum powder, or the like. Preferred is zinc oxide as (e) the metal compound used as the filler to adjust the weight and hardness of the spherical core. It is considered that zinc oxide functions as a vulcanization activator and increases the hardness of the entire core. The content of the metal compound used as the filler is preferably 0.5 part by mass or more, more preferably 1 part by mass or more, and is preferably 30 parts by mass or less, more preferably 25 parts by mass or less, even more preferably 20 parts by mass or less with respect to 100 parts by mass of the base rubber.

The metal compounds may be used solely or in combination of at least two of them.

The core rubber composition preferably further contains (f) an organic sulfur compound. In the present invention, by using (f) the organic sulfur compound and (d) the carboxylic acid and/or the salt thereof in combination for the core rubber composition, the degree of the outer-hard and inner-soft structure of the core can be controlled, while maintaining approximate linearity of the core hardness distribution. (f) The organic sulfur compound is not particularly limited, as long as it is an organic compound having a sulfur atom in the molecule thereof. Examples thereof include an organic compound having a thiol group (—SH), a polysulfide bond having 2 to 4 sulfur atoms (—S—S—, —S—S—S—, or —S—S—S—S—), or a metal salt thereof (—SM, -S-M-S-, —S-M-S—S—, —S—S-M-S—S—, —S-M-S—S—S—, or the like; M is a metal atom). Furthermore, (f) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds. (f) The organic sulfur compound includes, for example, thiophenols, thionaphthols, polysulfides, thiocarboxylic acids, dithiocarboxylic acids, sulfenamides, thiurams, dithiocarbamates, and thiazoles. From the aspect of the larger hardness distribution of the spherical core, (f) the organic sulfur compound preferably includes, organic sulfur compounds having a thiol group (—SH) or a metal salt thereof, more preferably thiophenols, thionaphthols, or a metal salt thereof. Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel (II), zirconium (II), and tin (II).

Examples of the thiophenols include, for example, thiophenol; thiophenols substituted with a fluoro group, such as 4-fluorothiophenol, 2,5-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,5-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,5-diiodothiophenol, 2,4,5-triiodothiophenol, 2,4,5,6-tetraiodothiophenol, pentaiodothiophenol and the like; or a metal salt thereof. As the metal salt, zinc salt is preferred.

Examples of the thionaphthols are 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, and 1-acetyl-2-thionaphthol and metal salts thereof. Preferable examples include 1-thionaphthol, 2-thionaphthol or zinc salt thereof.

The sulfenamide based organic sulfur compound includes, for example, N-cyclohexyl-2-benzothiazole sulfenamide, N-oxydiethylene-2-benzothiazole sulfenamide, and N-t-butyl-2-benzothiazole sulfenamide. The thiuram based organic sulfur compound includes, for example, tetramethylthiuram monosulfide, tetramethylthiuram disulfide, tetraethylthiuram disulfide, tetrabutylthiuram disulfide, and dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbate, iron (III) dimethyldithiocarbamate, selenium diethyldithiocarbamate, and tellurium diethyldithiocarbamate. The thiazole based organic sulfur compound includes, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl)mercaptobenzothiazole, and 2-(2,6-diethyl-4-morpholinothio)benzothiazole.

(f) The organic sulfur compound can be used solely or as a mixture of at least two of them.

The content of (f) the organic sulfur compound is preferably 0.05 part by mass or more, more preferably 0.1 part by mass or more, and is preferably 5.0 parts by mass or less, more preferably 2.0 parts by mass or less with respect to 100 parts by mass of (a) the base rubber. If the content of (f) the organic sulfur compound is less than 0.05 part by mass, an effect of adding (f) the organic sulfur compound cannot be obtained and thus the resilience of the golf ball may not improve. If the content of (f) the organic sulfur compound exceeds 5.0 parts by mass, the compression deformation amount of the obtained golf ball becomes large and thus the resilience may be lowered.

The rubber composition used in the present invention may further include additives such as an antioxidant, a peptizing agent, and a softener. Further, as described above, if the rubber composition used in the present invention contains only the $\alpha,\beta$-unsaturated carboxylic acid having 3 to 8 carbon atoms as a crosslinking agent, the rubber composition preferably contains (e) the metal compound.

The content of the antioxidant is preferably 0.1 part by mass or more and 1 part by mass or less with respect to 100 parts by mass of (a) the base rubber. The content of the peptizing agent is preferably 0.1 part by mass or more and 5 parts by mass or less with respect to 100 parts by mass of (a) the base rubber.

The present invention provides a method for manufacturing a golf ball, comprising the steps of: blending (a) a base rubber, (b) an $\alpha,\beta$-unsaturated carboxylic acid having 3 to 8 carbon atoms and/or a metal salt thereof as a co-crosslinking agent, (c) a crosslinking initiator, (d) a carboxylic acid and/or a salt thereof having a number-average particle size ranging from 15 µm to 60 µm, and where necessary (e) a metal compound to prepare a core rubber composition; molding the core rubber composition into a spherical core under following conditions (1) to (3): (1) press pressure: 1.0 MPa to 10.0 MPa; (2) press temperature: 130° C. to 170° C.; and (3) press time: 5 minutes to 20 minutes; and forming at least one cover layer on the spherical core.

Preparing the core rubber composition is, for example, conducted by blending and kneading (a) the base rubber, (b) the $\alpha,\beta$-unsaturated carboxylic acid having 3 to 8 carbon atoms and/or the metal salt thereof as a co-crosslinking agent, (c) the crosslinking initiator, (d) the carboxylic acid and/or the salt thereof having the number-average particle size ranging from 15 µm to 60 µm, and where necessary (e) the metal compound. A method of kneading is not particularly limited, and the kneading is conducted using publicly known kneading machines such as a kneading roll mill, a banbury mixer, a kneader, or the like.

In the step of preparing the core rubber composition, it may take a long time to knead the blending materials homogenously when kneading all blending materials with the roll mill. Therefore, in the step of preparing the core rubber composition in the method for manufacturing the golf ball of the present invention, it is preferred to employ a masterbatch method which comprises the steps of blending (a) the base rubber and at least (d) the carboxylic acid and/or the salt thereof having the number-average particle size ranging from 15 µm to 60 µm to prepare a first masterbatch; blending (a) the base rubber and at least (c) the crosslinking initiator to prepare a second masterbatch, and blending the first masterbatch and the second masterbatch to prepare the core rubber composition. That is, (d) the carboxylic acid and/or the salt thereof having the number-average particle size ranging from 15 µm to 60 µm and (c) the crosslinking initiator are separately blended into (a) the base rubber respectively to prepare the first masterbatch and the second masterbatch, then the first masterbatch and second masterbatch are blended, thereby improving kneading workability of the core rubber composition. Hereinafter, the masterbatch method will be described.

First, the step of blending (a) the base rubber and at least (d) the carboxylic acid and/or the salt thereof having the number-average particle size ranging from 15 µm to 60 µm to prepare the first masterbatch will be described. As (a) the base rubber blended in the step of preparing the first masterbatch, a commercially available base rubber may be directly used for the blending without any treatment, but the base rubber is preferably masticated before the blending. "Masticating" means a basic operation in which a mechanical force is applied to a base rubber to disentangle the molecular aggregation or break the molecular chain, thereby adjusting the degree of plasticity of the rubber to such a level that the rubber is easily processed. The mastication is preferably conducted by using a known kneading machine such as a roll mill (open roll mill) or a kneader. The temperature of the base rubber during the mastication is preferably 30° C. or more, and more preferably 40° C. or more, and is preferably 100° C. or less, and more preferably 90° C. or less. In addition, the time for masticating the base rubber is preferably 0.1 minute or longer, and more preferably 0.5 minute or longer, and is preferably 12 minutes or shorter, and more preferably 10 minutes or shorter. The mastication of (a) the base rubber and the blending of (a) the base rubber and (d) the carboxylic acid and/or the salt thereof having the number-average particle size ranging from 15 µm to 60 µm can be conducted sequentially, simultaneously, or continuously.

In the step of preparing the first masterbatch, the material temperature during the kneading of (a) the base rubber and at least (d) the carboxylic acid and/or the salt thereof having the number-average particle size ranging from 15 µm to 60 µm is preferably 90° C. or less, and more preferably 85° C. or less. This is because if the kneading temperature (material temperature) exceeds 90° C., (d) the carboxylic acid and/or the salt thereof may not be dispersed homogenously. The kneading temperature of preparing the first masterbatch is preferably 45° C. or more, and more preferably 50° C. or more. If the kneading temperature to prepare the first masterbatch is too low, (d) the carboxylic acid and/or the salt thereof may not be dispersed homogenously. Further, the kneading time is preferably 0.5 minute or longer, more preferably 1.0 minute or longer, and is preferably 20 minutes or shorter, more preferably 15 minutes or shorter. If the kneading time falls within the above range, (a) the base rubber and (d) the carboxylic acid and/or the salt thereof having the number-average particle size ranging from 15 µm to 60 µm are dispersed homogenously. It is preferred that (d) the carboxylic acid and/or the salt thereof having the number-average particle size ranging from 15 µm to 60 µm is blended only in the step of preparing the first masterbatch.

The kneading of (a) the base rubber and at least (d) the carboxylic acid and/or the salt thereof having the number-average particle size ranging from 15 µm to 60 µm is preferably conducted using a known kneading machine such as a roll mill, a kneader, a banbury mixer, or the like. In light of enhancing the efficiency of the kneading, the kneader providing a large shear or banbury mixer is preferably used.

In the present invention, "kneading" means mixing and dispersing several kinds of blending materials having different properties into the base rubber, on the basis of the formulation of the core rubber composition, while applying a mechanical shear force. In addition, the "masterbatch" is an intermediate composition obtained by blending at least some of the blending materials in consideration of the dispersibility, the reactivity, and the workability of the materials to be blended in the rubber composition. The use of the masterbatched intermediate composition improves the blending workability. For example, with respect to "the blending material A" that is difficult to blend, "the blending material A" is blended in the rubber at the concentration which is higher than that of the blending material A contained in the final rubber composition to prepare the intermediate composition previously. If the previously prepared intermediate composition and the other blending materials is blended in such a way that the intermediate composition is diluteed, the final rubber composition can be prepared without any difficulty in blending the blending material A each time.

In a preferable embodiment of the present invention, (a) the base rubber and (d) the carboxylic acid and/or the salt thereof having the number-average particle size ranging from 15 μm to 60 μm are preferably blended in the presence of at least one kind of metal-containing components to prepare the first masterbatch. This is because if (a) the base rubber and (d) the carboxylic acid and/or the salt thereof having the number-average particle size ranging from 15 μm to 60 μm are blended in the presence of the metal-containing component, (a) the base rubber and (d) the carboxylic acid and/or the salt thereof having the number-average particle size ranging from 15 μm to 60 μm can be dispersed more homogenously.

In the step of preparing the first masterbatch in the presence of at least one kind of metal-containing components, it is preferable that (a) the base rubber and the metal-containing component are blended, and subsequently (d) the carboxylic acid and/or the salt thereof having the number-average particle size ranging from 15 μm to 60 μm is blended with the obtained mixture. Alternatively, it is preferable that (a) the base rubber, (d) the carboxylic acid and/or the salt thereof having the number-average particle size ranging from 15 μm to 60 μm, and the metal-containing component are preferably blended simultaneously. According to a method where (a) the base rubber and (d) the carboxylic acid and/or the salt thereof having the number-average particle size ranging from 15 μm to 60 μm are blended and subsequently the metal-containing component is blended with the obtained mixture, the blending materials may not be mixed well.

The metal-containing component is not particularly limited, as long as the metal containing component is a blending material other than (d) component (carboxylic acid and/or the salt thereof having the number-average particle size ranging from 15 μm to 60 μm) blended in the rubber composition and contains a metal. The metal-containing component includes, for example, the metal salt of (b) the α,β-unsaturated carboxylic acid having 3 to 8 carbon atoms, (e) the metal compound blended where necessary, and a metal salt of (f) the organic sulfur compound. The metal-containing component preferably includes the zinc compound.

In a preferable embodiment of the present invention, the first masterbatch is preferably prepared in the presence of the metal salt of (b) the α,β-unsaturated carboxylic acid having 3 to 8 carbon atoms and/or (e) the metal compound as the metal-containing component. The first masterbatch is more preferably prepared in the presence of a zinc salt of (b) the α,β-unsaturated carboxylic acid having 3 to 8 carbon atoms used as the co-crosslinking agent and/or (e) a zinc compound as the metal-containing component, and even more preferably prepared in the presence of (b) zinc acrylate and/or (e) zinc oxide as the metal-containing component.

In the step of preparing the first masterbatch, the adding amount of (d) the carboxylic acid and/or the salt thereof having the number-average particle size ranging from 15 μm to 60 μm is preferably 25 parts by mass or more, more preferably 30 parts by mass or more, even more preferably 35 parts by mass or more, and is preferably 150 parts by mass or less, more preferably 140 parts by mass or less, even more preferably 130 parts by mass or less with respect to 100 parts by mass of (a) the base rubber. If the content of (d) the carboxylic acid and/or the salt thereof is made high, it is possible to reduce the adding amount of the first masterbatch when preparing the core rubber composition.

In the step of preparing the first masterbatch, the blending amount of the metal-containing component is preferably 10 parts by mass or more, more preferably 20 parts by mass or more, and is preferably less than 200 parts by mass, more preferably 180 parts by mass or less with respect to 100 parts by mass of (a) the base rubber. If the content of the metal-containing component falls within the above range, kneading workability becomes better.

If (b) the α,β-unsaturated carboxylic acid having 3 to 8 carbon atoms and/or the metal salt thereof used as the co-crosslinking agent is blended in the step of preparing the first masterbatch, the blending amount thereof is preferably 10 parts by mass or more, more preferably 15 parts by mass or more, even more preferably 20 parts by mass or more, and is preferably 150 parts by mass or less, more preferably 120 pats by mass or less, even more preferably 100 parts by mass or less with respect to 100 parts by mass of (a) the base rubber.

If (e) the metal compound is blended in the step of preparing the first masterbatch, the blending amount thereof is preferably 5 parts by mass or more, more preferably 10 parts by mass or more, even more preferably 15 parts by mass or more, and is preferably 100 parts by mass or less, more preferably 90 parts by mass or less, even more preferably 80 pars by mass or less with respect to 100 parts by mass of (a) the base rubber.

Next, the step of blending (a) the base rubber and at least (c) the crosslinking initiator to prepare the second masterbatch will be described. As (a) the base rubber blended in the step of preparing the first masterbatch, a commercially available base rubber may be directly used for the blending without any treatment, but the base rubber is preferably masticated before the blending. The mastication is preferably conducted by using a known kneading machine such as a roll mill or a kneader. The temperature of the base rubber during the mastication is preferably 30° C. or more, more preferably 40° C. or more, and is preferably 100° C. or less, more preferably 90° C. or less. In addition, the time for masticating the base rubber is preferably 0.1 minute or longer, more preferably 0.5 minute or longer, and is preferably 12 minutes or shorter, more preferably 10 minutes or shorter. The mastication of (a) the base rubber and the blending of (a) the base rubber and (c) the crosslinking initiator can be conducted sequentially, simultaneously, or continuously.

In the step of preparing the second masterbatch, the material temperature during the kneading of (a) the base rubber and at least (c) the crosslinking initiator is preferably 95° C. or more, and more preferably 100° C. or more. If the kneading temperature (material temperature) is less than 95° C., the core may not show the required performance. The kneading temperature in preparing the second masterbatch is preferably 125° C. or less, and more preferably 120° C. or less. If the kneading temperature in preparing the second masterbatch is too high, the rubber may be scorched. In addition, the kneading time is preferably 1 minute or longer, more preferably 1.5 minutes or longer, and is preferably 15 minutes or shorter, more preferably 10 minutes or shorter. If the kneading time is within the above range, the blending materials are sufficiently dispersed.

The kneading of (a) the base rubber and at least (c) the crosslinking initiator is preferably conducted using a known kneading machine such as a roll mill, a kneader, a banbury mixer, or the like. In light of enhancing the efficiency of the kneading, the kneader providing a large shear force or banbury mixer is preferably used.

In the step of preparing the second masterbatch, the adding amount of (c) the crosslinking initiator is preferably 0.3 part by mass or more, more preferably 0.5 part by mass or more, and is preferably 3.0 parts by mass or less, more preferably 2.5 parts by mass or less with respect to 100 parts by mass of (a) the base rubber. If the adding amount of the (c) crosslinking initiator falls within the above range, a necessary crosslinking reaction occurs to provide required performance.

In the step of preparing the second masterbatch, (b) the α,β-unsaturated carboxylic acid having 3 to 8 carbon atoms and/or the metal salt thereof; (e) the metal compound and (f) the organic sulfur compound which are added where necessary; or the like may be blended in addition to (a) the base rubber and (c) the crosslinking initiator. It is preferred that (d) the carboxylic acid and/or the salt thereof having the number-average particle size ranging from 15 μm to 60 μm is blended only in the step of preparing the first masterbatch.

The embodiments of blending the blending materials constituting the core rubber composition in the steps of preparing the first masterbatch and second masterbatch include the following embodiments.

(i) Embodiment which comprises blending (a) the base rubber, (d) the carboxylic acid and/or the salt thereof having the number-average particle size ranging from 15 μm to 60 μm, (b) the α,β-unsaturated carboxylic acid having 3 to 8 carbon atoms and/or the metal salt thereof as the co-crosslinking agent, and (e) the metal compound in the step of preparing the first masterbatch; and blending (a) the base rubber, (c) the crosslinking initiator, (b) the α,β-unsaturated carboxylic acid having 3 to 8 carbon atoms and/or the metal salt thereof as the co-crosslinking agent, and where necessary (e) the metal compound and/or (f) the organic sulfur compound, in the step of preparing the second masterbatch;

(ii) Embodiment which comprises blending (a) the base rubber, (d) the carboxylic acid and/or the salt thereof having the number-average particle size ranging from 15 μm to 60 μm, and the metal salt of (b) the α,β-unsaturated carboxylic acid having 3 to 8 carbon atoms as the co-crosslinking agent in the step of preparing the first masterbatch; and blending (a) the base rubber, (c) the crosslinking initiator, (b) the α,β-unsaturated carboxylic acid having 3 to 8 carbon atoms and/or the metal salt thereof as the co-crosslinking agent, and where necessary (e) the metal compound and/or (f) the organic sulfur compound, in the step of preparing the second masterbatch; and (iii) Embodiment which comprises blending (a) the base rubber, (d) the carboxylic acid and/or the salt thereof having the number-average particle size ranging from 15 μm to 60 μm, and (e) the metal compound in the step of preparing the first masterbatch; and blending (a) the base rubber, (c) the crosslinking initiator, (b) the α,β-unsaturated carboxylic acid having 3 to 8 carbon atoms and/or the metal salt thereof as the co-crosslinking agent, and where necessary (e) the metal compound and/or (f) the organic sulfur compound, in the step of preparing the second masterbatch.

Next, the step of blending the first masterbatch and the second masterbatch to prepare the core rubber composition will be described. In the step of preparing the core rubber composition, the material temperature during the kneading of the first masterbatch and the second masterbatch is preferably 90° C. or less, and more preferably 85° C. or less. If the kneading temperature (material temperature) exceeds 90° C., the core rubber composition may be attached to a kneading machine, resulting in significant reduction of the working efficiency. The kneading temperature is preferably 30° C. or more, and more preferably 40° C. or more. If the kneading temperature is too low, the insufficient dispersion may occur. In addition, the kneading time is preferably 1 minute or longer, more preferably 2 minutes or longer, and is preferably 15 minutes or shorter, more preferably 10 minutes or shorter. If the kneading time falls within the above range, the dispersion becomes homogenous and a variation in physical properties is reduced.

The kneading of the first masterbatch and second masterbatch may be conducted using a known kneading machine, and preferably conducted by a roll mill. Use of the roll mill prevents an excessive raise in the material temperature and attachment of a powder to the kneading machine, thereby significantly improving workability.

The blending ratio of the first masterbatch and second masterbatch may be determined appropriately in accordance with the composition of the final core rubber composition; however, the blending ratio (first masterbatch/second masterbatch) (mass ratio) of the first masterbatch to the second masterbatch preferably ranges from 1/99 to 50/50, more preferably from 5/95 to 30/70.

Next, the step of molding the core rubber composition obtained by blending into the spherical core will be described. In the method for manufacturing the golf ball of the present invention, the core rubber composition is molded into the spherical core under following conditions (1) to (3):

(1) press pressure: 1.0 MPa to 10.0 MPa;
(2) press temperature: 130° C. to 170° C.; and
(3) press time: 5 minutes to 20 minutes.

By molding the core rubber composition into the spherical core under the above conditions, the variation in the compression deformation amount of the obtained spherical core is reduced. As a result, the spherical core having stabilized properties is obtained.

In light of molding a spherical core having stable properties, press pressure, press temperature, and press time are preferably as follows.

(1) Press pressure is preferably 1.0 MPa or more, more preferably 3.5 MPa or more, and is preferably to 10.0 MPa or less, more preferably 7.0 MPa or less.

(2) Press temperature is preferably 130° C. or more, more preferably 135° C. or more, even more preferably 140° C. or more, and is preferably 170° C. or less.

(3) Press time is preferably 5 minutes or more, more preferably 6 minutes or more, and is preferably 20 minutes or less.

Hereinafter, the step of molding the core rubber composition into the spherical core will be described concretely, but an embodiment of molding the spherical core is not limited to the embodiment. The core rubber composition obtained after kneading is extruded with an extruder into a bar shape and cut in a predetermined length to produce a preform (also referred to as "plug"). Alternatively, the core rubber composition may be formed into a thick sheet shape and stamped out to obtain a plug. The size of each plug may be changed as appropriate in accordance with the size of a mold for compression molding. Preferably, the obtained plugs are immersed, for example, in an anti-blocking agent solution such that the plugs are not attached to each other, dried, and then are matured for about 8 to 48 hours. Next, each plug is placed into the mold for molding the core and press-molded under the above conditions.

The method for manufacturing the golf ball of the present invention comprises the step of forming at least one cover layer covering the spherical core which is obtained by molding. An embodiment for molding a cover includes an embodiment which comprises injection molding the cover composition containing a resin component directly onto the core, or an embodiment which comprises molding the cover composition containing a resin component into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

Examples of the resin component contained in the cover composition include, for example, an ionomer rein; a thermoplastic polyurethane elastomer having a commercial name of "Elastollan" commercially available from BASF Japan Ltd; a thermoplastic polyamide elastomer having a commercial name of "Pebax" commercially available from Arkema K. K.; a thermoplastic polyester elastomer having a commercial name of "Hytrel" commercially available from Du Pont-Toray Co., Ltd.; and a thermoplastic styrene elastomer having a commercial name of "Rabalon" commercially available from Mitsubishi Chemical Corporation; and the like.

The ionomer resin includes a product prepared by neutralizing at least a part of carboxyl groups in the binary copolymer composed of an olefin and an α,β-unsaturated carboxylic acid having 3 to 8 carbon atoms with a metal ion, a product prepared by neutralizing at least a part of carboxyl groups in the ternary copolymer composed of an olefin, an α,β-unsaturated carboxylic acid having 3 to 8 carbon atoms, and an α,β-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Of these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Of these, the ionomer resin preferably includes the metal ion-neutralized product of the binary copolymer composed of ethylene-(meth)acrylic acid and the metal ion-neutralized product of the ternary copolymer composed of ethylene, (meth)acrylic acid, and (meth)acrylic acid ester.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8320 (Na), Surlyn 9320 (Zn), Surlyn 6320 (Mg), HPF 1000 (Mg), HPF 2000 (Mg))" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins. The ionomer resins may be used alone or as a mixture of at least two of them.

The cover composition constituting the cover of the golf ball of the present invention preferably includes, as a resin component, a thermoplastic polyurethane elastomer or an ionomer rein. In case of using the ionomer rein, it is preferred to use a thermoplastic styrene elastomer together. The content of the polyurethane or ionomer resin in a resin component of the cover composition is preferably 50 mass % or more, more preferably 60 mass % or more, even more preferably 70 mass % or more.

In the present invention, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair performance of the cover.

The amount of the white pigment (for example, titanium oxide) is preferably 0.5 part or more, more preferably 1 part or more, and the content of the white pigment is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. Further, if the amount of the white pigment is more than 10 parts by mass, the durability of the resultant cover may deteriorate.

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By molding under the above conditions, a golf ball cover having a uniform thickness can be formed.

In the case of directly injection molding the cover composition, the cover composition extruded in the pellet form beforehand may be used for injection molding or the materials such as the base resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the core is placed in the mold, held with the protruded hold pin, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 second to 5 seconds, and after cooling for 10 seconds to 60 seconds, the mold is opened.

After the cover is molded, the mold is opened and the golf ball body is taken out from the mold, and where necessary the golf ball body is preferably subjected to surface treatments such as deburring, cleaning, and sandblast. If desired, a paint film or a mark may be formed.

The golf ball construction of the inventive golf ball is not limited, as long as the golf ball has a spherical core and at least one cover layer covering the spherical core. The spherical core preferably has a single layered structure. Unlike the multi-layered structure, the spherical core of the single layered structure does not have an energy loss at the interface of the multi-layered structure when hitting, and thus has an improved resilience. The cover has a structure of at least one layer, for example a single layered structure, or a multi-layered structure of at least two layers.

The golf ball of the present invention includes, for example, a two-piece golf ball comprising a spherical core and a single layered cover disposed around the spherical core, a multi-piece golf ball comprising a spherical core, and at least two cover layers disposed around the spherical core (including the three-piece golf ball), and a wound golf ball comprising a spherical core, a rubber thread layer which is formed around the spherical core, and a cover disposed over the rubber thread layer. The present invention can be suitably applied to any one of the above golf balls. If the golf ball of the present invention has a multi-layer cover, the cover disposed between the outermost layer and the spherical core may be referred to as an intermediate layer or inner layer cover (inner cover).

The FIGURE is a partially cutaway sectional view showing the golf ball 2 according to the preferable embodiment of the present invention. The golf ball 2 comprises a spherical core 4, and a cover 12 covering the spherical core 4. Plurality of dimples 14 are formed on a surface of the cover. Other portions than dimples 14 on the surface of the golf ball 2 are referred to as "land 16". The golf ball 2 is provided with a paint layer and a mark layer outside the cover 12, but these layers are not depicted.

The spherical core preferably has such a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core.

The spherical core was cut into two hemispheres to obtain a cut plane, and the hardness of the spherical core were measured at the central point and at intervals of 2.5 mm from the central point along the arbitrary radius of the spherical core. Although the number of measuring points changes depending upon the radius of the spherical core, the hardness distribution of the whole core is obtained by measuring the hardness at intervals of 2.5 mm. Further, the hardness at the surface of the spherical core is measured. Next, the JIS-C hardness measured as described above is assigned to the vertical axis and the distance (mm) from the core center is assigned to the horizontal axis, and measurement results are plotted therein to create a graph. In the present invention, $R^2$ of a linear approximation curve obtained from this plot by the least square method is preferably 0.95 or higher. $R^2$ of a linear approximation curve obtained by the least square method is an index representing the linearity of an obtained plot. In the present invention, if $R^2$ is 0.95 or higher, it means that the hardness distribution of the spherical core is linear or almost linear. A golf ball with a spherical core having a linear or almost linear hardness distribution exhibits a reduced spin rate upon driver shots. As a result, a flight distance on driver shots increases. $R^2$ of the linear approximation curve is preferably 0.96 or higher. Increasing the linearity provides a greater flight distance on driver shots.

The spherical core preferably has a hardness difference (Hs−Ho) between a surface hardness Hs and a center hardness Ho of 18 or more, more preferably 20 or more, even more preferably 22 or more, and preferably has a hardness difference of 80 or less, more preferably 70 or less, even more preferably 60 or less in JIS-C hardness. If the hardness difference between the center hardness and the surface hardness is large, the golf ball having a great flight distance due to the high launch angle and low spin rate is obtained. On the other hand, if the hardness difference is too large, the durability of the obtained golf ball may be lowered.

The spherical core preferably has the center hardness Ho of 30 or more, more preferably 40 or more, even more preferably 45 or more in JIS-C hardness. If the center hardness Ho is less than 30 in JIS-C hardness, the core becomes too soft and thus the resilience may be lowered. Further, the spherical core preferably has the center hardness Ho of 70 or less, more preferably 65 or less, even more preferably 60 or less in JIS-C hardness. If the center hardness Ho exceeds 70 in JIS-C hardness, the core becomes too hard and thus the shot feeling tends to be lowered.

The spherical core preferably has the surface hardness Hs of 72 or more, more preferably 74 or more, even more preferably 76 or more, and preferably has the surface hardness Hs of 100 or less, more preferably 95 or less in JIS-C hardness. If the surface hardness is 72 or more in JIS-C hardness, the spherical core does not become excessively soft, and thus the better resilience is obtained. Further, if the surface hardness of the spherical core is 100 or less in JIS-C hardness, the spherical core does not become excessively hard, and thus the better shot feeling is provided.

The spherical core preferably has the diameter of 34.8 mm or more, more preferably 36.8 mm or more, and even more preferably 38.8 mm or more, and preferably has the diameter of 42.2 mm or less, more preferably 41.8 mm or less, and even more preferably 41.2 mm or less, and most preferably 40.8 mm or less. If the spherical core has the diameter of 34.8 mm or more, the thickness of the cover does not become too thick and thus the resilience becomes better. On the other hand, if the spherical core has the diameter of 42.2 mm or less, the thickness of the cover does not become too thin, and thus the cover functions better.

When the spherical core has a diameter from 34.8 mm to 42.2 mm, a compression deformation amount (shrinking deformation amount of the spherical core along the compression direction) of the spherical core when applying a load from 98 N as an initial load to 1275 N as a final load is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better. If the compression deformation amount is 6.0 mm or less, the resilience of the golf ball becomes better. Variation in the compression deformation amount of the spherical core is preferably within 0.15 mm.

In the present invention, the thickness of the cover of the golf ball is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. In case of a plurality of cover layers, it is preferred that the total thickness of the cover layers falls within the above range.

The slab hardness of the cover composition is preferably determined in accordance with the desired performance of the golf balls. For example, in case of a so-called distance golf ball which focuses on a flight distance, the cover composition constituting the outermost cover layer (hereinafter, sometimes may be merely referred to as "outermost cover layer composition") preferably has a slab hardness of 50 or more, more preferably 55 or more, and preferably has a slab hardness of 80 or less, more preferably 70 or less in Shore D hardness. If the outermost cover layer composition has a slab hardness of 50 or more, the obtained golf ball has a high launch angle and low spin rate on driver shots and iron shots, and thus the flight distance becomes large. If the outermost cover layer composition has a slab hardness of 80 or less, the golf ball excellent in durability is obtained. Further, in case of a so-called spin golf ball which focuses on controllability, the outermost cover layer composition preferably has a slab hardness of less than 50, and preferably has a slab hardness of 20 or more, more preferably 25 or more in Shore D hardness. If the outermost cover layer composition has a slab hardness of less than 50, the flight distance on driver shots can be improved by the core of the present invention, as well as the obtained golf ball readily stops on the green due to the high spin rate on approach shots. If the outermost cover layer composition has a slab hardness of 20 or more, the abrasion resistance improves.

In case of a plurality of cover layers, the cover composition constituting the intermediate layer or inner cover layer (hereinafter, sometimes may be merely referred to as "inner cover layer composition") preferably has a slab hardness of 40 or more, more preferably 45 or more, more preferably 48 or more, and preferably has a slab hardness of 80 or less, more preferably 75 or less, even more preferably 70 or less in Shore D hardness. If the slab hardness of the inner layer cover composition is 40 or more in Shore D hardness, the rigidity of the intermediate layer or inner cover layer enhances and thus the golf ball with an excellent resilience is obtained. If the slab hardness of the inner cover layer composition is 80 or less in Shore D hardness, the durability of the obtained golf ball improves.

The concave portions called "dimple" are usually formed on the surface of the cover. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or at least two of them may be used in combination.

It is preferred that a paint film is formed on a surface of the golf ball body. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus exhibits the good shot feeling. On the other hand, if the compression deformation amount is 5.0 mm or less, the resilience is enhanced.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Compression Deformation Amount (mm) and Variation in Compression Deformation Amount (mm)

A compression deformation amount of the core or golf ball (a shrinking amount of the core or golf ball in the compression direction thereof), when applying a load from 98 N as an initial load to 1275 N as a final load to the core or golf ball, was measured. The measurement was conducted by using eight samples for each core, and a difference between the maximum value and minimum value was regarded as variation in the compression deformation amount.

(2) Coefficient of Restitution

A 198.4 g of metal cylindrical object was allowed to collide with each core or golf ball at a speed of 40 m/sec, and the speeds of the cylindrical object and the core or golf ball before and after the collision were measured. Based on these speeds and the mass of each object, coefficient of restitution for each core or golf ball was calculated. The measurement was conducted by using twelve samples for each core or golf ball, and the average value was regarded as the coefficient of restitution for the core or golf ball. The coefficient of restitution of the core is shown as the difference from that of core No. 13.

(3) Hardness Distribution of Spherical Core (JIS-C Hardness)

A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness of the spherical core. The spherical core was cut into two hemispheres to obtain a cut plane, and the hardness were measured at the central point and at predetermined distances from the central point. The core hardness were measured at 4 points at predetermined distances from the central point of the cut plane of the core. The core hardness was calculated by averaging the hardness measured at 4 points.

(4) Scatterability

The scatterability of the carboxylic acid and/or the salt thereof during kneading was evaluated as follows. The scatterability was evaluated based on a weight change ratio of the blended composition after kneading to the charged amount.

and the total kneading time was 7 minutes. No problem on workability was found and workability was good. In the step of preparing the second masterbatch, the base rubber was masticated, and then all the blending materials were kneaded at the same time. The kneading for the second masterbatch was conducted by using a kneader (capacity: 55 L). With respect to the conditions for the mastication of the base rubber, the material temperature was 50° C. and the kneading time was 3 minutes. With respect to the conditions for preparing the second masterbatch (the kneading of the blending materials), the material temperature was 105° C. and the kneading time was 4 minutes.

To the entire second masterbatch obtained, 30 parts by mass of the first masterbatch was added and kneaded, to make core rubber compositions. The kneading of the first masterbatch and the second masterbatch was conducted at 75° C. for 6 minutes by using a roll (roll diameter: 22 inches). The kneading workability was good. The obtained core rubber compositions were extruded with an extruder to make plugs. The obtained plugs were placed into upper and lower molds each having a hemispherical cavity, and hot-pressed under the conditions shown in Tables 5 to 7, to obtain spherical cores.

TABLE 3

| | | | First masterbatch manufacturing method No. | | | |
|---|---|---|---|---|---|---|
| | | | 1 | 2 | 3 | 4 |
| Composition (Parts by mass) | 1. Polybutadiene rubber | | 100 | 100 | 100 | 100 |
| | 2. Zinc caprylate: number-average particle size 5 μm | | 25 | — | — | — |
| | 2. Zinc caprylate: number-average particle size 20 μm | | — | 25 | — | — |
| | 2. Zinc caprylate: number-average particle size 40 μm | | — | — | 25 | — |
| | 2. Zinc caprylate: number-average particle size 1 mm | | — | — | — | 25 |
| | 3. Zinc oxide | | 25 | 25 | 25 | 25 |
| Blending material charging procedure | First step | | 1 | 1 | 1 | 1 |
| | Second step | | 2, 3 | 2, 3 | 2, 3 | 2, 3 |
| Kneading temperature (° C.) | | | 85 | 85 | 85 | 86 |
| Kneading workability | | | Good | Good | Good | Good |
| Amount of scattering (g) | | | 1.7 | 0.4 | 0.3 | 0.2 |
| Weight decrease ratio (%) | | | 1.13 | 0.27 | 0.20 | 0.13 |
| Degree of scattering | | | Poor | Good | Good | Good |

Good (G): The weight decrease ratio is 0.8% or less.
Poor (P): The weight decrease ratio is more than 0.8%.

(5) Number-Average Particle Size (μm)

The number-average particle size (μm) was determined using a laser diffraction/scattering particle size distribution measuring instrument ("LA-910" available from HORIBA, Ltd).

[Production of Golf Ball]
(1) Production of Spherical Core

The blending materials shown in Tables 3 and 4 were kneaded with a kneader to prepare a first masterbatch and a second masterbatch. First, the polybutadiene was masticated (first step) and then zinc caprylate and zinc oxide were added at the same time and kneaded. The kneading for the first masterbatch was conducted by using a kneader (capacity: 55 L). With respect to the conditions for the mastication of the base rubber (first step), the material temperature was 50° C. and the kneading time was 3 minutes. With respect to the conditions for preparing the first masterbatch (second step and third step), the material temperature was 85° C. or less

TABLE 4

| | | Second masterbatch manufacturing method of No. | | |
|---|---|---|---|---|
| | | I | II | III |
| Composition (parts by mass) | Polybutadiene rubber | 80 | 80 | 80 |
| | Zinc acrylate | 35 | 30 | 25 |
| | Barium sulfate | *1) | *1) | *1) |
| | Dicumyl peroxide | 0.8 | 0.8 | 0.8 |
| | 2-thionaphthol | 0.2 | 0.2 | 0.2 |
| Kneading temperature (° C.) | | 105 | 105 | 105 |

*1) As to an amount of barium sulfate, adjustment was made such that the golf ball had a mass of 45.4 g

TABLE 5

| | | Golf ball No. | | | | |
|---|---|---|---|---|---|---|
| | | 1 | 2 | 3 | 4 | 5 |
| First masterbatch No. | | 1 | 1 | 2 | 2 | 2 |
| Second masterbatch No. | | I | I | I | II | III |
| Rubber composition (parts by mass) | Polybutadiene rubber | 100 | 100 | 100 | 100 | 100 |
| | Zinc acrylate | 35 | 35 | 35 | 30 | 25 |
| | Zinc oxide | 5 | 5 | 5 | 5 | 5 |
| | Barium sulfate | *1) | *1) | *1) | *1) | *1) |
| | 2-thionaphthol | 0.2 | 0.2 | 0.2 | 0.2 | 0.2 |
| | Zinc caprylate (C8) | 5 | 5 | 5 | 5 | 5 |
| | Dicumyl peroxide | 0.8 | 0.8 | 0.8 | 0.8 | 0.8 |
| Number average particle size of carboxylic acid/salt (μm) | | 5 | 5 | 20 | 20 | 20 |
| Molding conditions | Press temperature (° C.) | 170 | 170 | 170 | 160 | 150 |
| | Press pressure (MPa) | 5 | 15 | 5 | 5 | 5 |
| | Press time (min.) | 8 | 8 | 8 | 11 | 15 |
| Core hardness distribution (JIS-C) | Core center hardness | 52.4 | 53.1 | 53.1 | 53.0 | 52.8 |
| | 2.5 mm | 57.0 | 57.0 | 57.0 | 57.0 | 56.8 |
| | 5.0 mm | 63.6 | 63.6 | 63.6 | 63.6 | 63.5 |
| | 7.5 mm | 65.4 | 65.4 | 65.4 | 65.4 | 65.4 |
| | 10.0 mm | 68.6 | 68.6 | 68.6 | 68.6 | 68.6 |
| | 12.5 mm | 70.6 | 70.6 | 70.6 | 70.6 | 70.6 |
| | 15.0 mm | 80.4 | 80.4 | 80.4 | 80.4 | 80.4 |
| | 17.5 mm | 84.0 | 84.0 | 84.0 | 84.0 | 84.0 |
| | Surface hardness | 89.7 | 89.8 | 89.8 | 89.6 | 89.6 |
| | Surface hardness − center hardness | 37.3 | 36.7 | 36.7 | 36.6 | 36.8 |
| | $R^2$ of approximated curve | 0.97 | 0.97 | 0.97 | 0.97 | 0.97 |
| | Slope of approximated curve | 1.81 | 1.79 | 1.79 | 1.79 | 1.80 |
| Spherical core | Diameter (mm) | 39.20 | 39.20 | 39.20 | 39.20 | 39.20 |
| | Coefficient of restitution | 0.000 | 0.000 | 0.000 | 0.000 | 0.000 |
| | Variation in compression deformation amount (mm) | 0.13 | 0.58 | 0.12 | 0.10 | 0.08 |

*1) As to an amount of barium sulfate, adjustment was made such that the golf ball had a mass of 45.4 g.

TABLE 6

| | | Golf ball No. | | | | |
|---|---|---|---|---|---|---|
| | | 6 | 7 | 8 | 9 | 10 |
| First masterbatch No. | | 2 | 2 | 2 | 3 | 3 |
| Second masterbatch No. | | I | II | III | I | II |
| Rubber composition (parts by mass) | Polybutadiene rubber | 100 | 100 | 100 | 100 | 100 |
| | Zinc acrylate | 35 | 30 | 25 | 35 | 30 |
| | Zinc oxide | 5 | 5 | 5 | 5 | 5 |
| | Barium sulfate | *1) | *1) | *1) | *1) | *1) |
| | 2-thionaphthol | 0.2 | 0.2 | 0.2 | 0.2 | 0.2 |
| | Zinc caprylate (C8) | 5 | 5 | 5 | 5 | 5 |
| | Dicumyl peroxide | 0.8 | 0.8 | 0.8 | 0.8 | 0.8 |
| Number average particle size of carboxylic acid/salt (μm) | | 20 | 20 | 20 | 40 | 40 |
| Molding conditions | Press temperature (° C.) | 170 | 160 | 150 | 170 | 160 |
| | Press pressure (MPa) | 15 | 15 | 15 | 5 | 5 |
| | Press time (min.) | 8 | 11 | 15 | 8 | 11 |
| Core hardness distribution (JIS-C) | Core center hardness | 53.1 | 53.0 | 52.8 | 53.1 | 53.0 |
| | 2.5 mm | 57.0 | 57.0 | 56.8 | 57.0 | 57.0 |
| | 5.0 mm | 63.6 | 63.6 | 63.5 | 63.6 | 63.6 |
| | 7.5 mm | 65.4 | 65.4 | 65.4 | 65.4 | 65.4 |
| | 10.0 mm | 68.6 | 68.6 | 68.6 | 68.6 | 68.6 |
| | 12.5 mm | 70.6 | 70.6 | 70.6 | 70.6 | 70.6 |
| | 15.0 mm | 80.4 | 80.4 | 80.4 | 80.4 | 80.4 |
| | 17.5 mm | 84.0 | 84.0 | 84.0 | 84.0 | 84.0 |
| | Surface hardness | 89.8 | 89.6 | 89.6 | 89.8 | 89.6 |
| | Surface hardness − center hardness | 36.7 | 36.6 | 36.8 | 36.7 | 36.6 |
| | $R^2$ of approximated curve | 0.97 | 0.97 | 0.97 | 0.97 | 0.97 |
| | Slope of approximated curve | 1.79 | 1.79 | 1.80 | 1.79 | 1.79 |
| Spherical core | Diameter (mm) | 39.20 | 39.20 | 39.20 | 39.20 | 39.20 |
| | Coefficient of restitution | 0.000 | 0.000 | 0.000 | 0.000 | 0.000 |
| | Variation in compression deformation amount (mm) | 0.56 | 0.48 | 0.40 | 0.12 | 0.10 |

*1) As to an amount of barium sulfate, adjustment was made such that the golf ball had a mass of 45.4 g.

TABLE 7

| | | Golf ball No. | | | | |
|---|---|---|---|---|---|---|
| | | 11 | 12 | 13 | 14 | 15 |
| First masterbatch No. | | 3 | 3 | 3 | 3 | 4 |
| Second masterbatch No. | | III | I | II | III | II |
| Rubber composition (parts by mass) | Polybutadiene rubber | 100 | 100 | 100 | 100 | 100 |
| | Zinc acrylate | 25 | 35 | 30 | 25 | 30 |
| | Zinc oxide | 5 | 5 | 5 | 5 | 5 |
| | Barium sulfate | *1) | *1) | *1) | *1) | *1) |
| | 2-thionaphthol | 0.2 | 0.2 | 0.2 | 0.2 | 0.2 |
| | Zinc caprylate (C8) | 5 | 5 | 5 | 5 | 5 |
| | Dicumyl peroxide | 0.8 | 0.8 | 0.8 | 0.8 | 0.8 |
| Number average particle size of carboxylic acid/salt (μm) | | 40 | 40 | 40 | 40 | 1000 |
| Molding conditions | Press temperature (° C.) | 150 | 170 | 160 | 150 | 160 |
| | Press pressure (MPa) | 5 | 15 | 15 | 15 | 5 |
| | Press time (min.) | 15 | 8 | 11 | 15 | 11 |
| Core hardness distribution (JIS-C) | Core center hardness | 52.8 | 53.1 | 53.0 | 52.8 | 53.0 |
| | 2.5 mm | 56.8 | 57.0 | 57.0 | 56.8 | 57.2 |
| | 5.0 mm | 63.5 | 63.6 | 63.6 | 63.5 | 63.7 |
| | 7.5 mm | 65.4 | 65.4 | 65.4 | 65.4 | 65.4 |
| | 10.0 mm | 68.6 | 68.6 | 68.6 | 68.6 | 68.6 |
| | 12.5 mm | 70.6 | 70.6 | 70.6 | 70.6 | 70.6 |
| | 15.0 mm | 80.4 | 80.4 | 80.4 | 80.4 | 80.4 |
| | 17.5 mm | 84.0 | 84.0 | 84.0 | 84.0 | 84.0 |
| | Surface hardness | 89.6 | 89.8 | 89.6 | 89.6 | 89.5 |
| | Surface hardness − center hardness | 36.8 | 36.7 | 36.6 | 36.8 | 36.5 |
| | R2 of approximated curve | 0.97 | 0.97 | 0.97 | 0.97 | 0.97 |
| | Slope of approximated curve | 1.80 | 1.79 | 1.79 | 1.80 | 1.78 |
| Spherical core | Diameter (mm) | 39.20 | 39.20 | 39.20 | 39.20 | 39.20 |
| | Coefficient of restitution | 0.000 | 0.000 | 0.000 | 0.000 | −0.001 |
| | Variation in compression deformation amount (mm) | 0.08 | 0.56 | 0.48 | 0.40 | 0.30 |

*1) As to an amount of barium sulfate, adjustment was made such that the golf ball had a mass of 45.4 g.

Raw materials used in Tables 3 and 4 are follows.
Polybutadiene rubber: a high-cis polybutadiene "BR730" (cis-1,4 bond content=96 mass %, 1,2-vinyl bond content=1.3 mass %, Moony viscosity (ML$_{1+4}$ (100° C.)=55, molecular weight distribution (Mw/Mn)=3) available from JSR Corporation Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium sulfate BD" manufactured by Sakai Chemical Industry Co., Ltd., adjustment was made such that the finally obtained golf ball had a mass of 45.4 g.
2-thionaphthol: manufactured by Tokyo Chemical Industry Co., Ltd.
Dicumyl peroxide: "Percumyl (registered trademark) D" manufactured by NOF Corporation.
Zinc caprylate (number average particle size 5 μm): manufactured by Mitsuwa Chemicals Co., Ltd.
Zinc caprylate (number average particle size 20 μm): manufactured by Nitto Kasei K.K.
Zinc caprylate (number average particle size 40 μm): manufactured by Nitto Kasei K.K.
Zinc caprylate (number average particle size 1 mm): manufactured by Nitto Kasei K.K.

The results shown in Tables 5 to 7 indicate that the spherical cores obtained by the manufacturing method comprising the steps of: blending (a) a base rubber, (b) an α,β-unsaturated carboxylic acid having 3 to 8 carbon atoms and/or a metal salt thereof as a co-crosslinking agent, (c) a crosslinking initiator, (d) a carboxylic acid and/or a salt thereof having a number-average particle size ranging from 15 μm to 60 μm, and (e) where necessary a metal compound to prepare a core rubber composition; and molding the core rubber composition into a spherical core under following conditions (1) to (3):

(1) press pressure: 1.0 MPa to 10.0 MPa;
(2) press temperature: 130° C. to 170° C.;
(3) press time: 5 minutes to 20 minutes have a less-variable compression deformation amount.

The present invention is useful as a method for manufacturing a golf ball traveling a great flight distance on driver shots. This application is based on Japanese Patent applications No. 2012-126598 filed on Jun. 1, 2012, the contents of which are hereby incorporated by reference.

The invention claimed is:

1. A method for manufacturing a golf ball, comprising the steps of:
blending (a) a base rubber, (b) an α,β-unsaturated carboxylic acid having 3 to 8 carbon atoms and/or a metal salt thereof as a co-crosslinking agent, (c) a crosslinking initiator, and (d) a carboxylic acid and/or a salt thereof which has a number-average particle size ranging from 15 μm to 60 μm, and which excludes (b) the co-crosslinking agent, to prepare a core rubber composition;
molding the core rubber composition into a spherical core under following conditions (1) to (3):
(1) press pressure: 1.0 MPa to 10.0 MPa;
(2) press temperature: 130° C. to 170° C.; and
(3) press time: 5 minutes to 20 minutes; and
forming at least one cover layer on the spherical core, wherein (e) a metal compound may further be blended into the core rubber composition for at least one purpose of a neutralizing agent to neutralize the α,β-unsaturated carboxylic acid having 3 to 8 carbon atoms if only (b) the α,β-unsaturated carboxylic acid having 3 to 8 carbon atoms is contained as the co-crosslinking agent, a weight adjusting agent to adjust the weight of the spherical core, a hardness adjusting agent to adjust the hardness of the spherical core, or an inorganic pigment, and wherein preparing the core rubber composition further comprises the steps of:

blending (a) the base rubber and at least (d) the carboxylic acid and/or the salt thereof having the number-average particle size ranging from 15 μm to 60 μm to prepare a first masterbatch;

blending (a) the base rubber and at least (c) the cross-linking initiator to prepare a second masterbatch; and blending the first masterbatch and the second masterbatch to prepare the core rubber composition.

2. The method for manufacturing the golf ball according to claim 1, wherein a zinc salt of an α,β-unsaturated carboxylic acid having 3 to 8 carbon atoms is used as (b) the co-crosslinking agent.

3. The method for manufacturing the golf ball according to claim 1, wherein a zinc compound is used as (e) the metal compound.

4. The method for manufacturing the golf ball according to claim 1, wherein a carboxylic acid having 1 to 30 carbon atoms and/or a salt thereof is used as (d) the carboxylic acid and/or the salt thereof having the number-average particle size ranging from 15 μm to 60 μm.

5. The method for manufacturing the golf ball according to claim 1, wherein a saturated fatty acid and/or a salt thereof is used as (d) the carboxylic acid and/or the salt thereof having the number-average particle size ranging from 15 μm to 60 μm.

6. The method for manufacturing the golf ball according to claim 1, wherein the core rubber composition contains (d) the carboxylic acid and/or the salt thereof having the number-average particle size ranging from 15 μm to 60 μm in an amount from 0.1 part by mass to 40.0 parts by mass with respect to 100 parts by mass of (a) the base rubber.

7. The method for manufacturing the golf ball according to claim 1, wherein the spherical core has such a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core.

8. The method for manufacturing the golf ball according to claim 1, wherein the spherical core has a hardness difference ranging from 18 to 80 in JIS-C hardness between a surface hardness Hs and a center hardness Ho thereof.

9. The method for manufacturing the golf ball according to claim 1, wherein (a) the base rubber and at least (d) the carboxylic acid and/or the salt thereof having the number-average particle size ranging from 15 μm to 60 μm are kneaded to prepare the first masterbatch while adjusting a material temperature thereof to 90° C. or less.

10. The method for manufacturing the golf ball according to claim 9, wherein (d) the carboxylic acid and/or the salt thereof having the number-average particle size ranging from 15 μm to 60 μm is blended in an amount of 25 parts by mass to 150 parts by mass with respect to 100 parts by mass of (a) the base rubber in the step of preparing the first masterbatch.

11. The method for manufacturing the golf ball according to claim 1, wherein (a) the base rubber and at least (c) the crosslinking initiator are kneaded to prepare the second masterbatch while adjusting a material temperature thereof to 95° C. or more.

12. The method for manufacturing the golf ball according to claim 1, wherein the first masterbatch and the second masterbatch are blended while adjusting a material temperature thereof to 90° C. or less.

13. The method for manufacturing the golf ball according to claim 1, wherein the first masterbatch is prepared in the presence of at least one kind of metal-containing components.

14. The method for manufacturing the golf ball according to claim 13, wherein the first masterbatch is prepared in the presence of the metal salt of (b) the α,β-unsaturated carboxylic acid having 3 to 8 carbon atoms which is the co-crosslinking agent and/or (e) the metal compound as the metal-containing component.

15. The method for manufacturing the golf ball according to claim 13, wherein the first masterbatch is prepared in the presence of a zinc compound as the metal-containing component.

16. The method for manufacturing the golf ball according to claim 13, wherein the first masterbatch is prepared in the presence of (b) zinc acrylate and/or (e) zinc oxide as the metal-containing component.

17. The method for manufacturing the golf ball according to claim 13, wherein the metal-containing component is contained in an amount of 10 parts by mass or more and less than 200 parts by mass with respect to 100 parts by mass of (a) the base rubber.

* * * * *